United States Patent [19]

Ohta

[11] 4,017,126
[45] Apr. 12, 1977

[54] VEHICLE ANTI-SKID BRAKING DEVICE

[75] Inventor: Yoshimoto Ohta, Kawasaki, Japan

[73] Assignee: Tokico Ltd., Japan

[22] Filed: Oct. 28, 1975

[21] Appl. No.: 626,445

[52] U.S. Cl. .................. 303/115; 188/181 A;
303/10; 303/116

[51] Int. Cl.² .................................. B60T 8/00

[58] Field of Search ........ 188/181 A; 303/10, 21 F, 303/61, 68, 115, 116

[56] References Cited

UNITED STATES PATENTS

| | | | |
|---|---|---|---|
| 3,514,162 | 5/1970 | Erlebach et al. | 303/21 F |
| 3,661,427 | 5/1972 | Hodge | 303/21 F |
| 3,666,328 | 5/1972 | Williams | 303/21 F |
| 3,677,608 | 7/1972 | Lewis | 303/21 F |
| 3,743,363 | 7/1973 | Hodge et al. | 303/21 F |

*Primary Examiner*—Stephen G. Kunin
*Attorney, Agent, or Firm*—Wenderoth, Lind & Ponack

[57] ABSTRACT

A vehicle anti-skid braking device has a housing, a first normally open valve disposed in the housing for controlling fluid flow through a first passage which is connected to a master cylinder and to a brake cylinder of a wheel of the vehicle, a second passage formed in the housing for receiving hydraulic fluid from a pump driven by the rotational force of the wheel, a first piston slidably disposed in a bore for actuating the first valve, a second piston slidably disposed in the second passage for cooperating with the first piston so as to cut off the major portion of hydraulic fluid supplied from the pump, and a third valve disposed in a third passage parallel with respect to the second passage for controlling the remaining portion of hydraulic fluid flow.

5 Claims, 2 Drawing Figures

VEHICLE ANTI-SKID BRAKING DEVICE

BACKGROUND OF THE INVENTION

The present invention relates to a vehicle hydraulic braking system and, more particularly, to an anti-skid braking device for controlling braking force when deceleration of a braked wheel exceeds a predetermined value.

In one prior art anti-skid braking device, braking pressure is controlled by means of an electromagnetic valve which is actuated by an electric signal issued from a detecting device sensitive to rotational speed or rate of variation in rotational speed of the braked wheel. In another prior art device, the inertia force of a flywheel or a governor driven by the braked wheel is utilized to actuate a mechanical valve which is operable to reduce braking pressure or to by-pass braking fluid to a reservoir.

The disadvantage of these prior art devices are such that the entire system incorporating such devices becomes complicated when the system utilizes the electric signal, and that the overall dimensions of the valve mechanism become large when a governor or the like has been incorporated therein.

BRIEF SUMMARY OF THE INVENTION

An object of the present invention is to provide an anti-skid braking device having a simple construction and which is compact in size and reliable in operation by providing a hydraulic pump which is driven by the braked wheel. Hydraulic pressure produced by the pump is utilized to control a valve mechanism interposed between the master cylinder and the wheel cylinder.

According to the present invention, there is provided a vehicle anti-skid braking device comprising a housing, a first valve disposed in the housing for controlling fluid flow through a first passage which is connected between a master cylinder and a brake cylinder of a wheel of the vehicle, a second passage disposed in the housing for receiving hydraulic fluid from a pump which is driven by the wheel, a first piston slidably disposed in a bore the opposite ends of which are open to the first and second passages respectively and which acts to open and close the first valve, a second piston slidably disposed in the second passage for cooperating with the first piston so as to cut off fluid flow through the second passage, and a third valve mechanism disposed in a third passage which is parallel with respect to the second passage.

BRIEF DESCRIPTION OF THE DRAWINGS

One embodiment of the present invention is illustrated in the accompanying drawing, in which.

DETAILED DESCRIPTION OF THE EMBODIMENT

Figure 1:
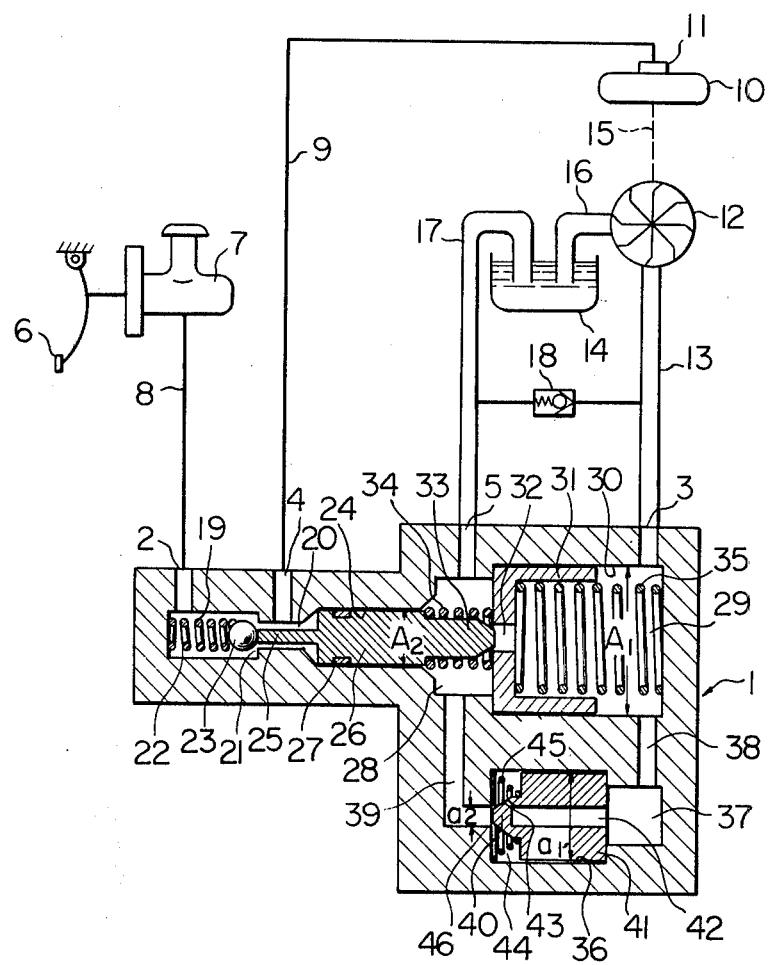
FIG. 1 is a longitudinal section of an anti-skid braking device and a schematic view of a hydraulic braking system.

In the drawing, a valve body 1 has two inlet ports 2 and 3, and two outlet ports 4 and 5. The inlet port 2 is connected through a line 8 to a master cylinder 7 which is operated by a treadle brake pedal 6. The outlet port 4 is connected through a line 9 to a wheel cylinder 11 of a wheel 10 of a vehicle. (The passage between the inlet port 2 and the outlet port 4 is referred as a first passage.)

Shown at 12 is a hydraulic pump coupled with the wheel 10 through a suitable drive means 15 such as a direct coupling or any suitable transmission mechanism having suitable speed ratio. Fluid discharged from the pump 12 is directed to the inlet port 3 of the valve body 1 through a pipe 13.

Shown at 14 is a reservoir filled with hydraulic fluid, and which is connected with a pipe 16 for supplying hydraulic fluid to the pump 12 and with a pipe 17 which is connected with the outlet port 5 of the valve body 1. A pressure relief valve 18 is disposed between the pipes 13 and 17 for permitting fluid flow from the pipe 13 to the pipe 17 when pressure in the pipe 13 exceeds a predetermined value ($P_o$).

A chamber 19 is formed in the valve body 1 for communicating with the inlet port 2 permanently. The right end of the chamber 19 is connected with a chamber 20 which is coaxial with the chamber 19 and the diameter of which is smaller than that of the chamber 19. A valve seat 21 is defined by the shoulder between the chambers 19 and 20. A valve member 23 in the form of a ball is urged against the valve seat 21 by means of a coil spring 21 disposed in the chamber 19.

The right end of the chamber 20 is connected with a first cylinder bore 24 the diameter of which is larger than that of the chamber 20. The bore 24 has a first piston 26 slidably and sealingly positioned therein. Shown at 25 is actuating rod secured to the first piston 26 for extending through the chamber 20 and engaging with the valve member 23. Shown at 27 is a seal ring.

The right end of the bore 24 is connected with a coaxial chamber 28 having a diameter larger than that of the bore 24, and the chamber 28 is connected to a coaxial bore or a second cylinder 30 of a still larger diameter. The bore 30 has a cup shaped second piston 31 sealingly and slidably positioned therein, and a chamber 29 is defined between the second piston and the closed end of the bore 30. The chamber 28 is connected with the outlet port 5, and the chamber 29 is provided with the inlet port 3.

The second piston 31 has a central opening 32 in the base portion of the cup, and a valve seat for cooperating with a valve portion 33 formed on the right end portion of the first piston 26 is defined on the circumference of the opening 32. The passage between the inlet 3 and the outlet 5 through the chambers 29, 28 and the opening 32 is referred to as a second passage. A spring 34 is disposed between the first and the second pistons 26 and 31 for urging them away from each other.

A spring 35 is disposed between the second piston 31 and the closed end of the bore 30, so that the piston 31 is normally urged against a shoulder defined at the step between the chamber 28 and the bore 30. The strengths of the springs 22 and 34 and 35 are such that the spring 22 is the weakest and the spring 35 is the strongest among them.

A third cylinder bore 36 is formed in the valve body 1, and one end of the bore 36 is communicated with the chamber 29 through a chamber 37 and a passage 38, and the other end is communicated with the chamber 28 through a passage 39.

The third cylinder bore 36 slidably receives a valve body 41 having a conically shaped end portion 40, which acts as a third valve cooperating with a valve seat 46 which is defined at the circumference of the open end of the passage 39. The valve body 41 is provided with a blind axial bore 42 and an orifice 43 which communicates the bore 42 with a chamber 44 defined at the left of the valve body 41 within the bore 36. A spring 45 is disposed in the chamber 44 for urging the valve body 41 rightward. Thus, communication between the passages 38 and 39 is normally attained through the chamber 37, the blind bore 42, the orifice 43, the chamber 44, and the space between the valve 40 and the valve seat 46.

In the drawing, shown at $A_1$ and $A_2$ are effective areas of the second cylinder 30 and the first cylinder 24, respectively, and at $a_1$ and $a_2$ are effective areas of the third cylinder 36 and the valve seat 46 respectively.

In operation, when the vehicle is running normally and the brake is not actuated, oil discharged from the pump 12 which is driven by the wheel 10 flows from the pipe 13 into the chamber 29 through the inlet port 3. The major portion of the oil flows from the chamber 29 through the opening 32, the chamber 28, and the pipe 17 into the reservoir 14. A portion of the oil in the chamber 29 flows through a third passage constituted by the passage 38, the chamber 37, the blind bore 42, the orifice 43, the chamber 44 and the passage 39 into the chamber 28, thereafter to the reservoir 14. In such condition, no appreciable pressure will be produced since the effective area of the opening 32 is sufficiently large to accommodate substantially all the flow.

Assuming that a driver of the vehicle depresses the brake pedal 6, pressurized oil from the master cylinder 7 is supplied through the inlet port 2, the chambers 19 and 20, the outlet port 4, and the pipe 9 to the wheel cylinder 11 so that braking action will be effected on the wheel 10.

The pressurized oil from the master cylinder 7 acts on the first piston 26 to urge it in the rightward direction in the drawing, but the piston 26 will not move until pressure in the chamber 20 overcomes the spring force of the spring 34. When the driver depresses the brake pedal 6 further and pressure in the chamber 20 overcomes the spring 34, the piston 26 moves rightwards, and thereby the opening 32 in the second piston 31 will be closed by engagement of the first piston 26 with the second piston 31. But, since the spring 35 is substantially stronger than the spring 34, the second piston 31 is maintained in its normal rest position, and the ball valve 23 is spaced from the valve seat 21, and thus the master cylinder 7 continues to supply pressurized oil to the wheel cylinder 11.

When the opening 32 is closed, oil discharged from the pump 12 is directed solely to the third passage comprising the passages 38 and 39, and thus, differential pressure will be produced between the chambers 37 and 44 by means of the orifice 43, and the valve body 41 will move leftwards by compressing the spring 45.

By the leftward movement of the valve body 41, the end portion 40 thereof engages with the valve seat 46 and closes communication between the passages 38 and 39. Thereafter, pressure corresponding to revolutional speed of the pump 12 is produced in the chamber 29. Thus, when the revolutional speed of the pump 12 is high, pressure urging the piston leftwards becomes high.

When the force urging the piston 31 leftwards which is the sum of the resilient force of the spring 35 and pressure in the chamber 29 multiplied by the effective area $A_1$ is larger than the force urging the first piston 26 rightwards which is equal to the pressure in the chamber 20 multiplied by the effective area $A_2$, the second piston 31 remains in the normal rest position and the valve member 23 is maintained at the position spaced from the valve seat 21 whereby the master cylinder 7 will continue to supply pressurized oil to the wheel cylinder 11.

When pressure in the wheel cylinder 11 is increased further, the braking force becomes larger than the frictional force acting between the braked wheel 10 and the surface of ground or road, the rotational speed of the wheel 10 will rapidly decrease whereby locking of the wheel 10 will tend to occur, and a skidding condition will arise. In such a condition, the rotational speed of the pump 12 will also decrease, thus decreasing pressure in the pressure chambers 29 and 37.

The valve body 41 will be moved rightwards in the drawing by means of the spring 45, thereby, the chamber 44 will be communicated with the passage 39.

When the chamber 44 is communicated with the passage 39, pressure in the chamber 29 decreases abruptly since the oil in the chamber 29 flows into the reservoir through the passage 38, the chamber 37, the bore 42, the orifice 43, the chamber 44, the passage 38, the chamber 28 and the pipe 17. Then, the first piston 26 and the second piston 31 are moved rightwards according to hydraulic pressure in the chamber 20, and the spring 35 is compressed.

The valve 23 seats on the valve seat 21, and the communication between the chambers 19 and 20, and thus between the wheel cylinder 11 and the master cylinder 7 will be cut off. The rightward movement of the first piston 26 is effective to increase the volume of the chamber 20, whereby, braking pressure in the wheel cylinder 11 will be reduced further. Accordingly, the braking force acting on the wheel 10 is decreased and the skidding condition can be prevented. When the braking force is decreased, the revolutional speed of the wheel 10 increases and pressure in the chamber 29 increases accordingly. Thereafter, the valve body 41 again moves leftwards and the third valve 40 again engages with the valve seat 46, and the communication between the passage 39 and the chamber 44 will be blocked again. Pressure in the chamber will rapidly increase and the second piston 31 moves the first piston 26 leftwards in the drawing, and the volume in the chamber 20 decreases and pressure acting on the wheel cylinder 11 and the braking force on the wheel 10 increases.

By making the effective area of the second piston 31 larger than that of the first piston 26, it is possible to make the braking pressure or pressure in the chamber 20 sufficiently high relative to pressure in the chamber 29 or the pump discharge pressure.

When hydraulic pressure in the chamber 29 becomes sufficiently high, the actuating rod 25 formed on the left end of the first piston 26 acts to separate the valve member 23 from the valve seat 21 so that braking action will be effected by hydraulic pressure in the master cylinder 7 which is now connected to the wheel cylinder 11.

The avove described steps will be repeated cyclically and thus the skidding condition can be avoided completely.

Figure 2:
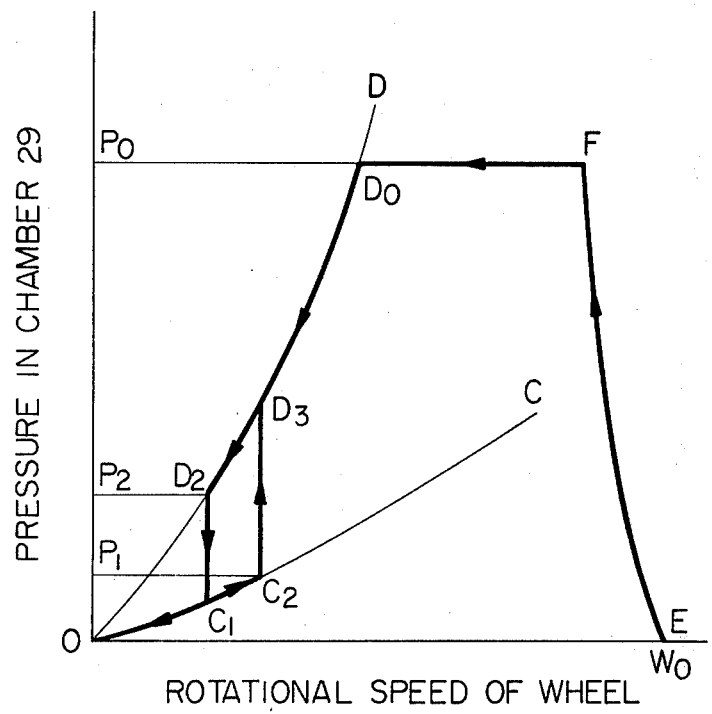
FIG. 2 is a diagram showing the relation between the rotational speed of the braked wheel and hydraulic pressure.

The above described stages of operation will be more clearly understood by the description given below with reference to FIG. 2 showing the relation between pressure in the chamber 29 and the rotational speed of the braked wheel.

In FIG. 2, the line OC shows the pressure in the chamber 29 when the hole 32 is closed and the valve 40 is open, and the line OD shows the pressure in the chamber 29 when both valves 33 and 40 are closed.

Assuming that the brake is applied at the point E in the drawing (the rotational speed of the wheel is $w_o$ and the pressure in the chamber 29 is substantially zero since the valves 33 and 40 are open), if the braking pressure supplied from the master cylinder 7 is sufficiently high, two valves 33 and 40 will shut rapidly and pressure is the chamber 29 increases to a predetermined maximum pressure $P_o$ which is given by the relief valve 18. As the rotational speed of the braked wheel decreases, the pressure in the chamber 29 changes along line $FD_oD_3D_2$. When the pressure decreases to $P_2$, the valve 40 opens and the pressure decreases to $P_1$ quickly, and the piston 31 and 26 move rightwards and thus decreases the braking pressure. Thereby, the braking force is reduced and the rotational speed of the wheel increases and the pressure in the chamber 29 changes along the line $C_1C_2$. At the point $C_2$ the valve 40 closes the passage 39 again and the pressure in the chamber 29 increases to the point $D_3$. Thus the pistons 31 and 26 move leftwards and the braking pressure is increased. The pressure in the chamber 29 changes along the line $D_3D_2$.

The cyclic change along the line $D_2C_1C_2D_3D_2$ will be repeated several times and thereafter the pressure decreases along the line $C_1O$ and the vehicle stops completely.

It will be noted that minimum braking pressure is assured by means of the spring 35 when the pressure in the chamber 29 is zero.

The opening and the closing pressure $P_2$ and $P_1$ of the valve 40 are determined by the following equations:

$$P_2 = F/a_1, \quad P_1 = F/a_2$$

in which F denotes the force of the spring 45.

As described above, the present invention provides a vehicle anti-skid braking device which is simple in construction, compact in size and reliable in operation without having any complicated portion such as a governor or the like.

What is claimed is:

1. A vehicle antiskid braking device for use in a hydraulic braking system for applying hydraulic pressure to a brake cylinder of a wheel of a vehicle and having a main valve means for controlling flow of hydraulic fluid to the brake cylinder, said device comprising a hydraulic pump driven by the rotational force of the wheel, a reservoir connected to said pump for supplying hydraulic fluid to the pump, a valve means comprising a bore having an inlet end connected to the pump and an outlet end connected to the reservoir, a valve member slidably disposed in the bore, one end of the valve member cooperating with the outlet end of the bore to cut off fluid communication therethrough, a spring in said bore urging the valve member toward the inlet end, said valve member having a leak passage formed therein to afford a restricted fluid flow through the valve member when said one end of the valve member is spaced from the outlet end, the valve means opening at a predetermined pressure and closing at a pressure lower than said predetermined pressure, and pressure responsive means coupled to said inlet end of said valve member and acting on said valve means for closing said main valve means when the pressure at said inlet to said valve means drops below a predetermined value.

2. A vehicle antiskid braking device according to claim 1 wherein said device further comprises a housing defining therein a chamber having an inlet for connection with a source of fluid pressure such as a pedal operated master cylinder, and an outlet for connection to the brake cylinder, said main valve means being in said housing controlling communication between the chamber inlet and the chamber outlet, and said pressure responsive means comprises a first bore in the housing in communication with said chamber, a first piston in said first bore and coupled to said first valve and movable between an advanced position in which said first valve is held open and the effective volume of the chamber is at a minimum and a retracted position in which said first valve is shut, a second bore in the housing communicating with said pump and a second piston in said second bore and engaging said first piston and receiving the hydraulic pressure of said inlet end of said valve member for movement between an advanced position when the hydraulic pump pressure is high in which the first piston is held in the advanced position and a retracted position when the hydraulic pump pressure is low in which the first piston is allowed to retract to the retracted position.

3. A vehicle antiskid braking device according to claim 2 in which the second piston has a hole therein and the adjacent end of the first piston cooperates therewith for forming a second valve, whereby when the first piston is moved by brake applying pressure said second valve closes to cut off fluid flow through the opening of the second piston to build up hydraulic pressure at the outlet of said hydraulic pump.

4. A vehicle antiskid braking device according to claim 2 further comprising spring means for normally urging the second piston to the advanced position, the second piston retracting when brake applying pressure acting on the first piston overcomes the force of the spring and pump outlet pressure acting on the second piston to move the first piston to the retracted position.

5. A vehicle antiskid braking device according to claim 2 in which the first piston moves to the retracted position when pump outlet pressure decreases below the predetermined pressure.

* * * * *